US006973323B2

(12) United States Patent
Oesterling et al.

(10) Patent No.: US 6,973,323 B2
(45) Date of Patent: Dec. 6, 2005

(54) METHOD AND SYSTEM FOR MOBILE TELEPHONE RESTRICTION BOUNDARY DETERMINATION

(75) Inventors: Christopher L. Oesterling, Troy, MI (US); Jeffrey M. Stefan, Clawson, MI (US); Steven P. Schwinke, Plymouth, MI (US); William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 427 days.

(21) Appl. No.: 10/268,352

(22) Filed: Oct. 10, 2002

(65) Prior Publication Data

US 2004/0203699 A1 Oct. 14, 2004

(51) Int. Cl.[7] .............................................. H04Q 7/20
(52) U.S. Cl. ............................. 455/456.4; 455/456.1; 455/456.5; 455/456.6; 370/328
(58) Field of Search .......................... 455/456.5, 456.6, 455/456.1, 456.4, 457, 422.1, 404.1, 565; 370/328

(56) References Cited

U.S. PATENT DOCUMENTS

| 6,032,054 | A | 2/2000 | Schwinke | |
|---|---|---|---|---|
| 6,424,912 | B1 | 7/2002 | Prammer et al. | |
| 6,427,119 | B1 | 7/2002 | Stefan et al. | |
| 6,597,906 | B1 * | 7/2003 | Van Leeuwen et al. | 455/436 |
| 6,721,572 | B1 * | 4/2004 | Smith et al. | 455/456.1 |
| 6,782,266 | B2 * | 8/2004 | Baer et al. | 455/456.4 |
| 6,799,052 | B2 * | 9/2004 | Agness et al. | 455/456.4 |
| 6,807,464 | B2 * | 10/2004 | Yu et al. | 701/1 |

OTHER PUBLICATIONS

U.S. Appl. No. 10/002,507, Method and System for Determining a Navigating Vehicle Locaton.
U.S. Appl. No. 10/151,578, Method of Cellular Connectivity Reporting.
U.S. Appl. No. 10/109,466, Method and System for Dynamically Determining Sleep Cycle Values in a Quiescent Mobile Vehicle.
U.S. Appl. No. 10/141,468, Method of Activating a Wireless Communication System in a Mobile Vehicle.
U.S. Appl. No. 10/001,941, Method and Device for Remotely Routing a Voice Call.
U.S. Appl. No. 10/059,549, Method and System for Real-Time Recording and Uploading of Vehicle Routes for Routing Assistance and Traffic Reporting.
U.S. Appl. No. 10/141,430, Method of Programming a Telematics Unit Using Voice Recognition.
U.S. Appl. No. 10/057,855, Method of Telematics Unit Configuration and Activation Using Vehicle Control Buttons.
U.S. Appl. No. 10/093,143, Method for Providing Route Instructions to a Mobile Vehicle.

(Continued)

Primary Examiner—William Trost
Assistant Examiner—Danh C. Le
(74) Attorney, Agent, or Firm—Anthony Luke Simon

(57) ABSTRACT

A method and system for mobile telephone restriction boundary determination are provided. The method provides boundary information to a user of a mobile telephone by determining geographic boundary information regarding mobile telephone usage restriction, and responsive to the determined geographical boundary information, providing an indication to the user of the mobile telephone of mobile telephone usage restriction.

1 Claim, 4 Drawing Sheets

OTHER PUBLICATIONS

U.S. Appl. No. 10/082,912, Method and System for Purchasing and Replenishing Wireless Network Calling Time.
U.S. Appl. No. 10/198,490, Method and System for Telematic Device Activation Attribute Formation.
U.S. Appl. No. 10/077,013, Method for Broadcast Filtering Using Convex Hulls.
U.S. Appl. No. 10/154,500, Method and System for Vehicle Data Upload.
U.S. Appl. No. 10/115,782, Method of Mobile Vehicle Relocation Determination.
U.S. Appl. No. 10/115,321, Method of Communicating with a Quiescent Vehicle.
U.S. Appl. No. 10/193,488, Method and System for Storing Iota Alert Message Requests for a Vehicle Communications Systems into a Queue.
U.S. Appl. No. 10/212,279, Method and System for Telematic Device Initialization Management.
U.S. Appl. No. 09/064,080, Vehicle Telecommunication Apparatus with RF Antenna Switching Arrangement.
U.S. Appl. No. 09/835,632, Method and System for Generating a List of Maneuvers for Navigation of a Vehicle.
U.S. Appl. No. 09/837,409, Method and System for Providing Multiple Beginning Maneuvers for Navigation of a Vehicle.
U.S. Appl. No. 09/835,531, Method and System for Providing Multiple Entry Points to a Vehicle Navigation Route.
U.S. Appl. No. 10/046,571, Dialing Programmed Numbers From a Mobile Communication Unit While Internationally Roaming.
U.S. Appl. No. 10/003,001, Method of Providing Vehicle Instructions to a Non-Navigable Point of Interest.
U.S. Appl. No. 10/002,323, Method and System for Reducing Shape Points for a Navigation System.
U.S. Appl. No. 10/001,579, Method and System for Reducing Maneuver Proximity Diameter for a Waypoint Navigation System.
U.S. Appl. No. 10/037,025, Method for Providing Vehicle Navigation Instructions.
U.S. Appl. No. 09/960,693, Method and System for Detecting and Correcting Off Route Navigation for Server Based Route Guidance Systems.
U.S. Appl. No. 10/036,570, Method for Providing Vehicle Navigation Instructions.
U.S. Appl. No. 10/001,105, Method of Providing a Cellular Service Connection for a Mobile Vehicle.
U.S. Appl. No. 10/000,268, Method of Providing a Wireless Service Connection for a Mobile Vehicle.
U.S. Appl. No. 09/960,438, Method and System for Mobile Vehicle Re-Routing.
U.S. Appl. No. 09/970,626, Method of Reducing Blocking for Cellular Phones.
U.S. Appl. No. 10/040,049, Method for Providing Multi-Path Communication for a Mobile Vehicle.
U.S. Appl. No. 10/000,269, Method and System for Detecting Anomalous Road Geometry for a Navigation System.
U.S. Appl. No. 09/970,575, Method and System for Navigation-Enhanced Directory Assistance.
U.S. Appl. No. 10/193,799, Vehicle Personalization Through a Web Portal.
U.S. Appl. No. 10/172,880, Mobile Vehicle Housing for a Portable Communication Device.
U.S. Appl. No. 10/209,014, Method of Activating an In-Vehicle Wireless Communication Device.
U.S. Appl. No. 10/243,481, Method of Configuring an In-Vehicle Telematics Unit.

* cited by examiner

METHOD AND SYSTEM FOR MOBILE TELEPHONE RESTRICTION BOUNDARY DETERMINATION

FIELD OF THE INVENTION

This invention relates to a method and system for mobile telephone restriction boundary determination.

BACKGROUND OF THE INVENTION

Wireless communication services, including telematics, are converging to create new applications for mobile vehicle users. These services have been expanded to include wireless network personal calling services. Portable telephones are also frequently used within mobile vehicles.

Despite the growth and portability of mobile telephones and telematics services, many communities are restricting mobile telephone use in mobile vehicles. Occupants in a vehicle within a restricted mobile telephone usage area may be unaware that the usage restriction exists.

SUMMARY OF THE INVENTION

Advantageously, this invention provides a method and system for mobile telephone restriction boundary determination.

Advantageously, according to a preferred example, this invention receives geographic boundary information that restricts mobile telephone usage. The current location of a mobile telephone is determined. The current location of the mobile telephone is compared to the boundary information. An indication is then provided to the mobile telephone user with respect to the geographic boundary information.

Advantageously then, according to another preferred example, this invention provides a method of constructing a polygon describing a geographic boundary from the boundary coordinates received. At least one polygon is constructed within the boundary coordinates that restricts mobile telephone usage. The current location of the mobile telephone is compared with the area constructed that restricts mobile telephone usage. Indications are provided when the mobile telephone approaches the area constructed that restricts mobile telephone usage, when the mobile telephone is within the area constructed that restricts mobile telephone usage, and when the mobile telephone exits the area constructed that restricts mobile telephone usage. An indication is also provided when the mobile telephone is outside of the area constructed that restricts mobile telephone usage.

In yet another preferred example, a mobile telephone receives indications when the mobile telephone is within a restricted usage area, near a restricted usage area, and outside of a restricted usage area.

DETAILED DESCRIPTION OF A PREFERRED EMBODIMENT

Figure 1:
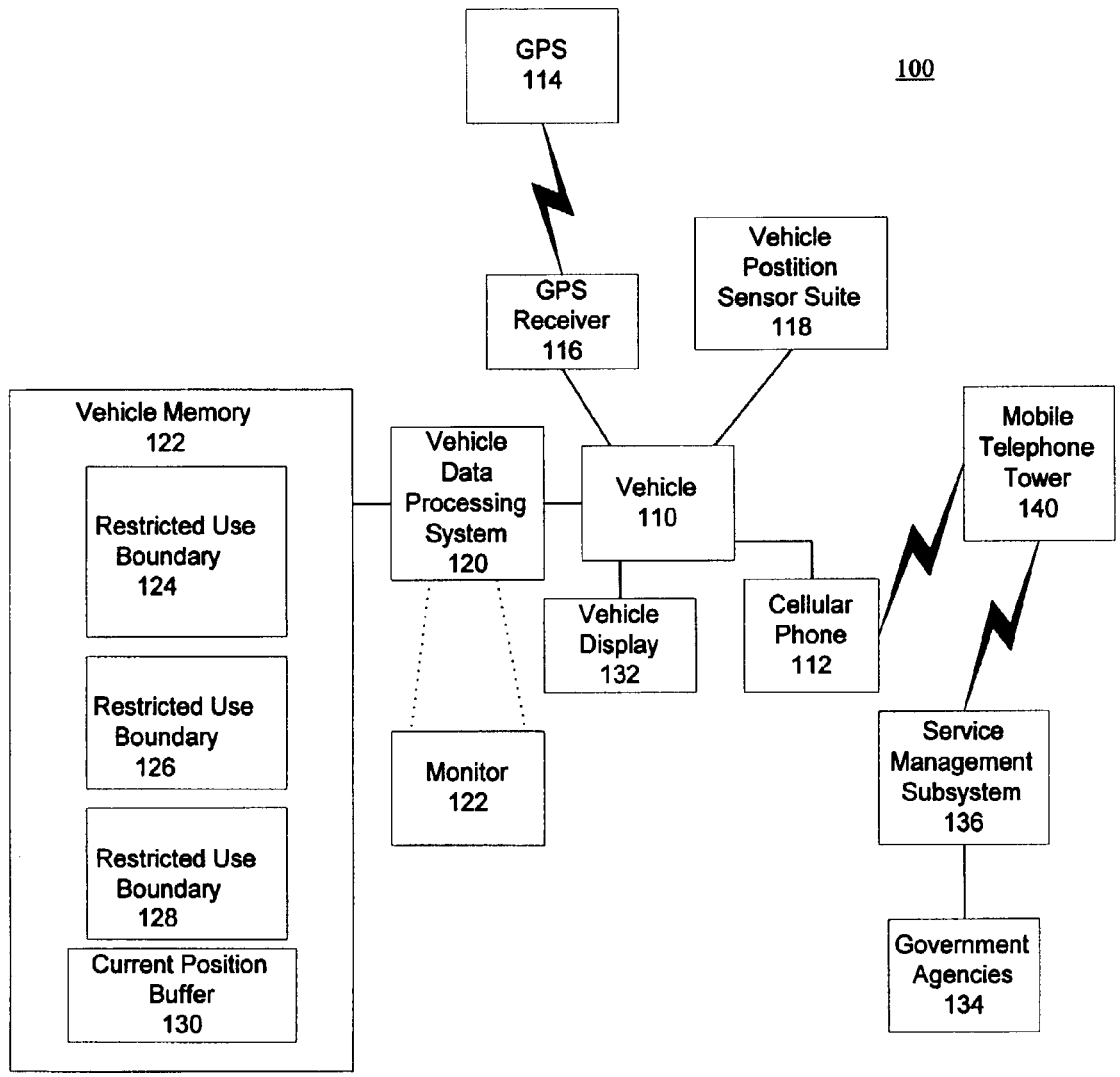
FIG. 1 is a schematic diagram of a system for processing mobile telephone restricted usage area information in accordance with an example of the present invention.

FIG. 1 illustrates an example system according to the present invention at 100 including a vehicle 110 that contains a mobile telephone 112. The vehicle 110 communicates with a GPS (Global Positioning System) receiver 116 and may alternatively communicate with a vehicle position sensor suite 118. A GPS receiver 116 and a vehicle sensor suite 118 may both be present in 110. The vehicle position sensor suite 118 may contain positional sensors and transducers of any type known to those skilled in the art. Example sensors and transducers include gyroscopes, accelerometers, magnetic direction sensing devices, and odometer-pulse information.

The GPS receiver accepts signals from the GPS satellite constellation 114. The signals are transformed by the GPS receiver 116 into the receiver's current geographical position. The current geographical position information is communicated to the vehicle data processing system 120 contained in the vehicle 110. The current geographical position information is stored in the current position buffer 130 contained within the vehicle memory 122 that is contained within the vehicle data processing system 120 and is updated periodically by the GPS receiver 116 or the vehicle position sensor suite 118.

Mobile telephone restricted usage boundary information is retrieved by a service management subsystem 136, such as a telematics call center, sent from government agencies 134 or some other information provider. The government agencies 134 or other information provider may provide mobile telephone restricted usage boundary information for regions, counties, cities, villages, or other geopolitically bounded area. This boundary information is transformed by the service management subsystem 136 into a set of signals representing geographic boundary coordinates, such as latitude and longitude values. The set of boundary coordinates is transmitted from the service management subsystem 136 to the mobile telephone 112 in the vehicle 110 via a cell tower 140. The boundary coordinates are relayed from the mobile telephone 112 in the vehicle 110 to the vehicle data processing system 120. The vehicle data processing system 120 stores the coordinates in a restricted use boundary data structure 120 contained within the vehicle memory 122. A plurality of restricted use boundary coordinates may be stored in a plurality of restricted use data structures in vehicle memory 122, as indicted by 126 and 128. In other examples, the boundary conditions may be downloaded through other data channels such as digital, satellite radio, or some other channel.

A representation of a geographic boundary, such as a polygon, is constructed from the coordinate data contained within the restricted use data structure 124. The value in the current position buffer 130 is compared to the polygon constructed from the data contained within 124. If the value in the current position buffer 130 falls inside of the polygon generated from 124, then an indication is provided to the vehicle display 132 by the vehicle data processing system 120. If the value in the current position buffer 130 is approaching the polygon generated from 124, then an indication that the mobile telephone is approaching a restricted area is provided to the vehicle display 132 by the vehicle data processing system 120. If the value in the current position buffer 130 is exiting the polygon generated from 124, then an indication that the mobile telephone is approaching a restricted area is provided to the vehicle display 132 by the vehicle data processing system 120. If the value in the current position buffer 130 falls outside of the polygon generated from 124, then an indication that the mobile telephone is outside the restricted area is provided to the display 132 by the vehicle data processing system 120.

While FIG. 1 shows the position sensing 116, 118, display 132, processing system 120, and memory 122, all as vehicle systems, it is well understood by those skilled in the art in view of the teachings herein that these functions can all be controlled and carried out within the hand-held mobile telephone unit.

Figure 2:
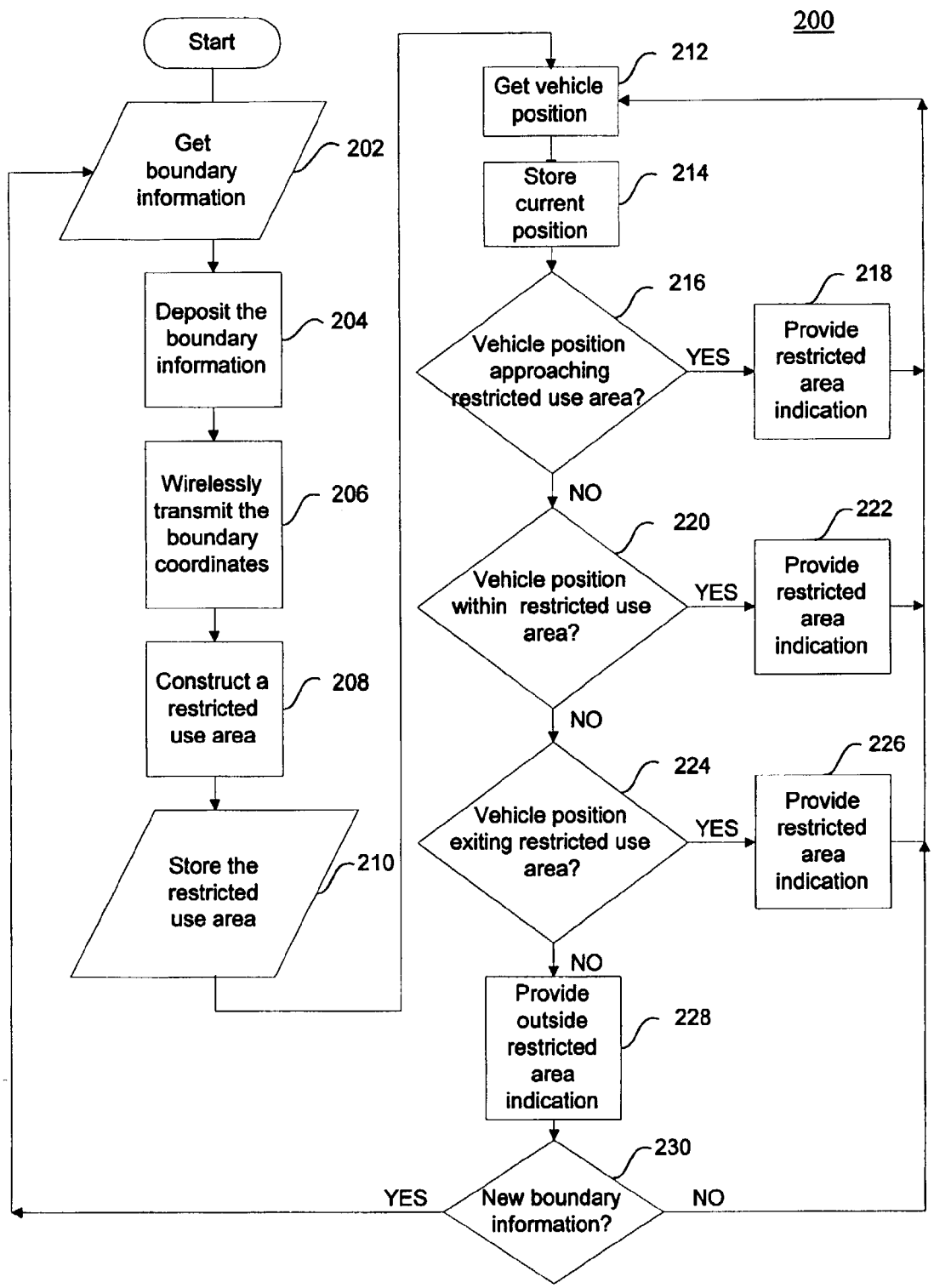
FIG. 2 is a flow chart of a system for processing mobile telephone restricted usage area information in accordance with an example of the present invention.

FIG. 2 shows a flow diagram providing an example method for delivering boundary information to a mobile phone user in accordance with the present invention at 200. Boundary information may be received by a plurality of external sources 202. The boundary information is deposited in a service management subsystem, such as a telematics call center 204. The boundary information is transmitted to a mobile vehicle data processing system 206. Within the mobile vehicle data processing system, the received boundary information, possibly in the form of latitude and longitude coordinates, are used to construct a restricted mobile phone usage area 208. This restricted area may be represented as a polygon or other geometric construct.

Once constructed, the restricted mobile phone usage area is stored within the mobile vehicle memory 210. The current position of the vehicle is acquired 212. The acquired current position of vehicle is stored in a current position buffer 214, possibly in the form of latitude and longitude coordinates.

A software monitor (122, FIG. 1), performs a series of comparisons on the data in the current position buffer 214 and the restricted use area 210. If the current positional value is approaching a restricted use area 216, then an indication is provided that states the vehicle is approaching a restricted use area 218. If the current positional value in the current position buffer 214 is within a restricted use area 220, then an indication is provided that states the vehicle is within a restricted use area 222. If the current positional value in the current position buffer 214 is exiting a restricted use area 224, then an indication is provided that states the vehicle is exiting a restricted use area 218. If the current positional value in the current position buffer 214 is not within a restricted use area 224, then an indication is provided that states the vehicle is not within a restricted use area 228. If new boundary information is received 230, then execution is directed to block 202. If new boundary information is not received, then execution is directed to block 212.

Figure 3:
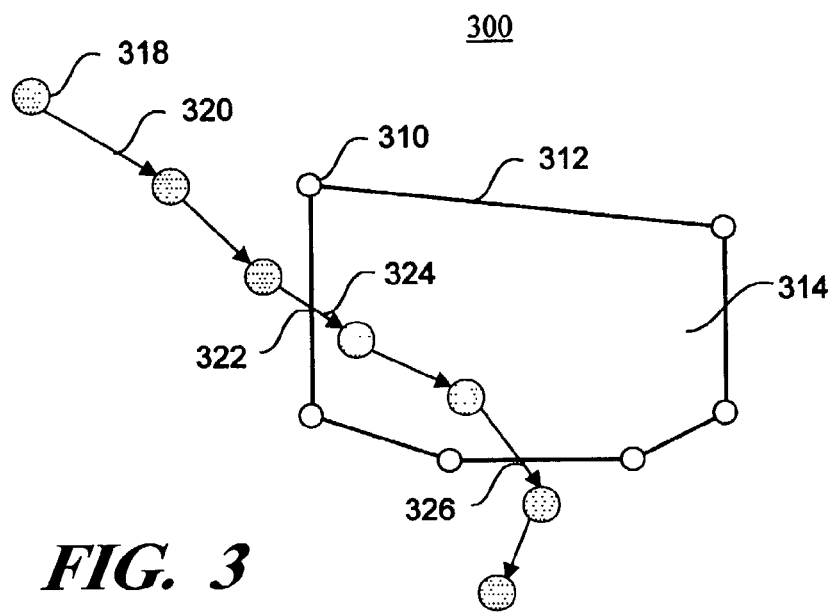
FIG. 3 is a schematic diagram of a system for constructing a set of bounded geographic regions in accordance with an example of the present invention.

FIG. 3 shows a schematic diagram providing an example method for constructing a mobile telephone restricted use boundary in accordance with the present invention at 300. Boundary information may be in the form of a plurality of geographic coordinates 310, such as latitude and longitude values. Arcs 312 are constructed between the geographic coordinates 310. The arcs 312 may approximate the curvature of the earth by methods well known in the art. The arcs 312 describe a polygon 314 that encapsulates the mobile telephone restricted use area.

The position of a moving vehicle 318 is recorded continuously or at intervals. A heading 320 is determined as the vehicle travels by methods well known in the art. As the vehicle 318 approaches a mobile telephone restricted use area 322, an indication that the vehicle 318 is approaching a mobile telephone restricted use area 314 is generated. As the vehicle 318 enters a mobile telephone restricted use area 324, an indication that the vehicle 318 is within a mobile telephone restricted use area 314 is generated. As the vehicle 318 exits a mobile telephone restricted use area 326, an indication that the vehicle 318 is exiting a mobile telephone restricted use area 314 is generated.

Figure 4:
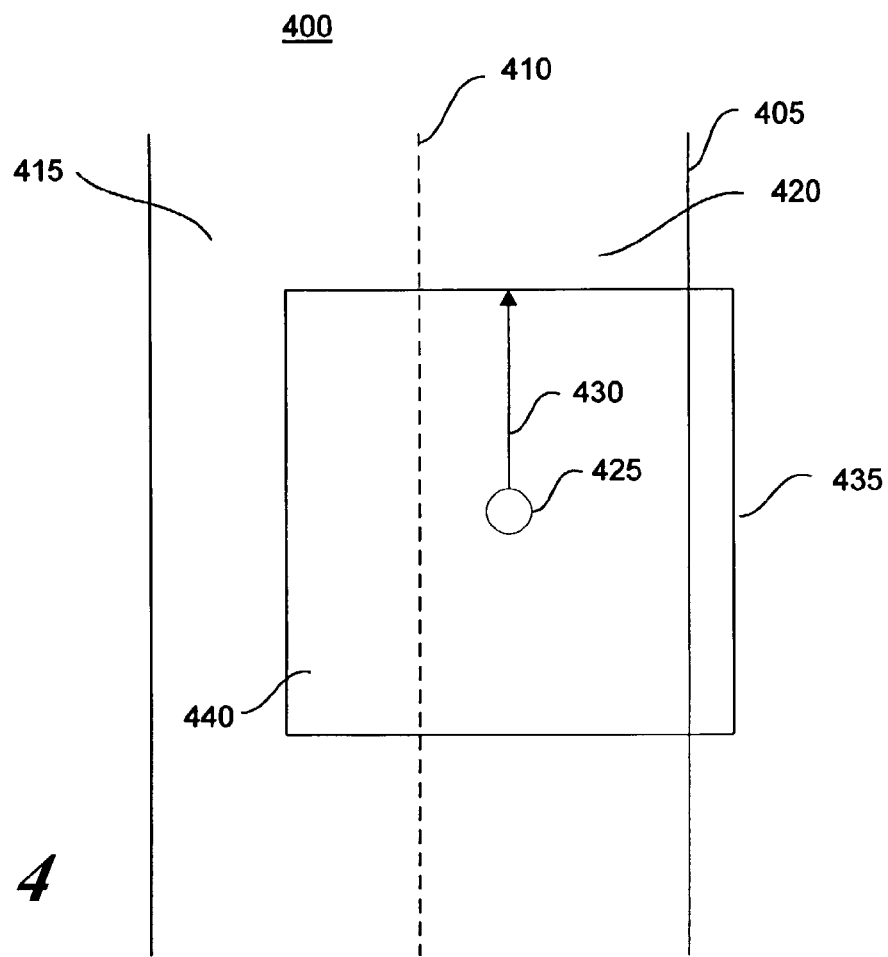
FIG. 4 is a schematic diagram of a road segment containing a polygon surrounding a vehicle containing mobile telephone in accordance with an example of the present invention.

FIG. 4 illustrates an example system according to the present invention at 400. A road segment 405 may divide a geographic boundary that restricts mobile telephone usage and does not restrict mobile telephone usage 410. The geographical boundary 410 may be a county, city, village, or other geo-political boundary. One side of the road segment 415 may reside in an area that restricts mobile telephone usage. Another side of the road 420 may reside in an area that allows mobile telephone usage. A vehicle containing a mobile telephone 425 may be traversing a road segment that lies in an area that allows mobile telephone usage 420. A perimeter 435 is constructed around the vehicle 425 via radius 430. Within the perimeter lies an area that restricts mobile telephone usage 440. An indication is generated to alert occupants of the vehicle that vehicle is in proximity of a restricted mobile telephone usage area 415.

Figure 5:
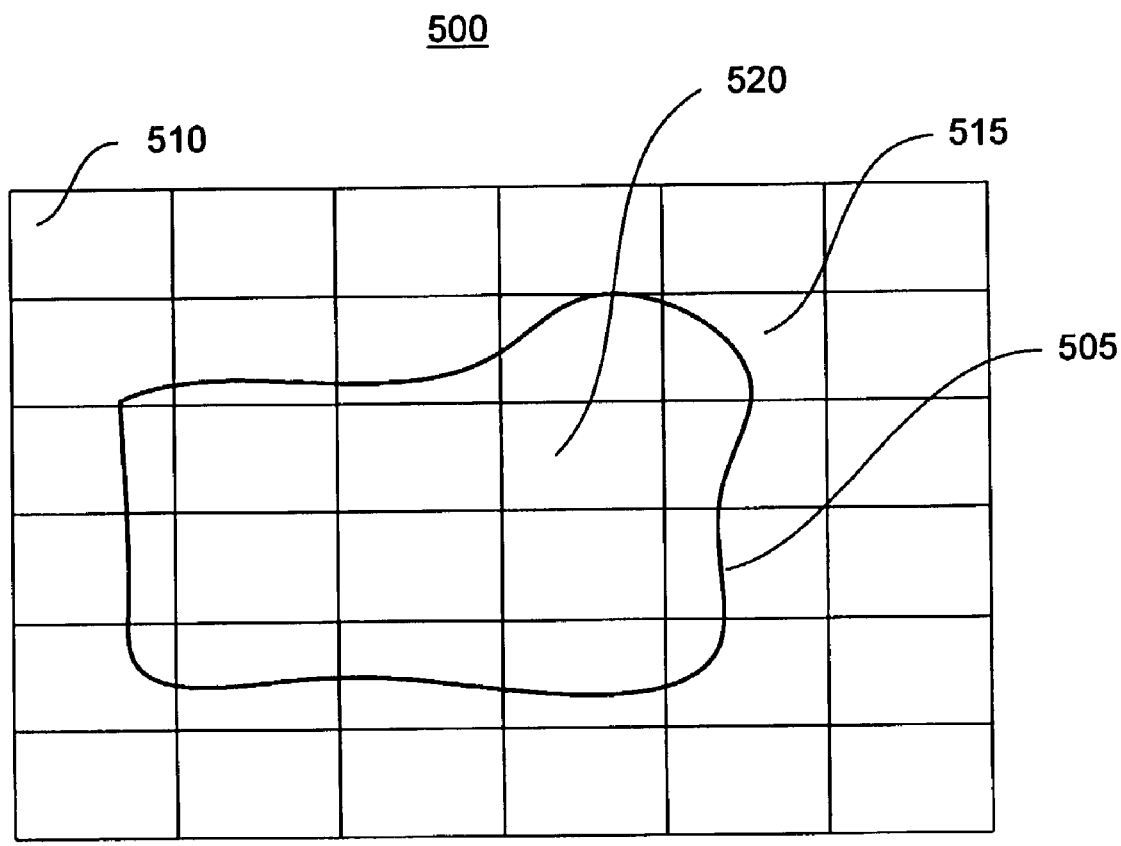
FIG. 5 is a schematic diagram of a mobile telephone tower network containing an area that restricts mobile telephone usage area in accordance with an example of the present invention.

FIG. 5 is a schematic diagram illustrating an example method for delivering boundary information to a mobile vehicle in accordance with the present invention at 500. Reference 505 represents a geographic boundary that restricts mobile telephone usage. Reference 510 represents a mobile telephone tower that lies outside of a geographic boundary that restricts mobile telephone usage. Mobile telephone tower 510 broadcasts an indication that a mobile telephone is not within a mobile telephone restricted use area. Reference 515 represents a mobile telephone tower that intersects a geographic boundary that does and does not restricts mobile telephone usage. Mobile telephone tower 515 broadcasts an indication that a mobile telephone is within proximity of an area that restricts mobile telephone usage. Reference 520 represents a mobile telephone tower that resides within a mobile telephone restricted usage area. Mobile telephone tower 520 broadcasts an indication that a mobile telephone is within an area that restricts mobile telephone usage.

What is claimed is:

1. A method of providing boundary information to a user of a mobile telephone comprising:
   a) determining geographic boundary information regarding mobile telephone usage restriction;
   b) responsive to the determined geographic boundary information, providing an indication to the user of the mobile telephone of mobile telephone usage restriction,
   wherein the determining step comprises the sub steps of:
   c) constructing a first polygon describing a geographic boundary from the geographic boundary information;
   d) constructing at least one second polygon containing an area that restricts mobile telephone usage within the geographic boundary; and e) comparing the current location of the mobile telephone to the area that restricts mobile telephone usage within the geographic boundary; and wherein the providing step comprises the sub-steps of:

f) indicating when the mobile telephone approaches said area that restricts mobile telephone usage within the geographic boundary;

g) indicating when the mobile telephone enters said area that restricts mobile telephone usage within the geographic boundary;

h) indicating when the mobile telephone is within said area that restricts mobile telephone usage within the geographic boundary;

i) indicating when the mobile telephone is exiting the area that restricts mobile telephone usage within the geographic boundary; and j) indicating when the mobile telephone is outside the geographic boundary.

* * * * *